United States Patent [19]

Anhalt

[11] 3,873,173

[45] Mar. 25, 1975

[54] ELECTRICAL CONNECTOR ASSEMBLY

[75] Inventor: John W. Anhalt, Orange, Calif.

[73] Assignee: International Telephone and Telegraph Corporation, New York, N.Y.

[22] Filed: Oct. 5, 1973

[21] Appl. No.: 404,370

[52] U.S. Cl. .............. 339/17 CF, 317/101, 339/174, 339/186 M, 339/256 R, 339/99

[51] Int. Cl. .............................................. H05k 1/07

[58] Field of Search ............... 317/101 CC, 101 CP; 174/DIG. 3; 339/17, 75, 74, 174, 176, 196, 256, 99, 184, 186

[56] References Cited

UNITED STATES PATENTS

| | | | |
|---|---|---|---|
| 3,475,657 | 10/1969 | Knowles | 339/17 C X |
| 3,696,323 | 10/1972 | Kinkaid et al. | 339/192 R |
| 3,700,788 | 10/1972 | Spurck | 174/52 S |
| 3,725,842 | 4/1973 | Feldberg | 339/17 CF |
| 3,754,203 | 8/1973 | Pauza et al. | 339/17 CF |
| 3,771,109 | 11/1973 | Bruckner et al. | 339/174 |
| 3,815,770 | 6/1974 | Anhalt et al. | 339/17 CF |

*Primary Examiner*—William H. Schultz
*Assistant Examiner*—Terrell P. Lewis
*Attorney, Agent, or Firm*—Thomas L. Peterson

[57] ABSTRACT

An electrical connector assembly for interconnecting a leadless integrated circuit element with a printed circuit board having conductive strips thereon. The connector assembly comprises an insulative housing member which is releasably mounted on the board and contains a plurality of compartments each receiving an electrical contact. Each contact is generally S-shaped. The upper portion of each contact engages a conductive pad on the bottom of the leadless integrated circuit element while the lower portion of the contact extends across an aperture in the bottom of the housing member to contact a conductive strip on the printed circuit board. The free end of the upper portion of each contact extends into a recess in the wall of the housing to retain the contact therein.

16 Claims, 8 Drawing Figures

ELECTRICAL CONNECTOR ASSEMBLY

BACKGROUND OF THE INVENTION

The present invention relates generally to an electrical connector assembly and, more particularly, to such an assembly for interconnecting an electrical circuit element having conductive pads on one surface thereof with a mounting member having conductive strips thereon.

A wide variety of electrical connector assemblies are available for interconnecting dual in-line plugs to printed circuit boards. some of these assemblies are simply in the form of insulative socket adaptors which provide interconnection between the electrical leads which extend downwardly from the sides of the dual in-line plug with the conductive strips on the printed circuit board. In other forms of such connector assemblies, the connector housing contains contacts which provide interconnection between individual leads on the dual in-line plug and corresponding conductive strips on the printed circuit board. It is desirable to minimize or eliminate soldering operations in interconnecting electrical circuit elements to printed circuit boards. Therefore, some of the aforementioned connectors employ contacts which have simply a wiping contact with conductive strips on the boards.

Recently leadless integrated circuit elements have become more attractive for MOS/LSI packaging due to high density and limited space requirements. These elements differ from the dual in-line plugs in that the leads are replaced by conductive pads coated on one surface, normally the lower surface, of the elements. Low cost connector assemblies are required for interconnecting these elements to printed circuit boards. It is desired, as in the case of connectors for dual in-line plugs, that the electrical connection be made between the components and conductive strips on the printed circuit boards without soldering. Thus, it is desirable that the leadless integrated circuit element connector employ contacts which have a wiping contact with the conductive strips on the board. It is also desirable that the connector assembly be simple in construction, thereby minimizing production costs by eliminating components and permitting the use of high production techniques with a minimum of assembly required. Also, the contacts should be relatively simple in configuration, yet provide a high unit force for effectively interconnecting the pads on the integrated circuit element with the conductive strips on the printed circuit board. The contacts should also be designed so that they may be produced by mass production techniques and assembled simultaneously into the connector assembly. In addition, the contacts should be suitably retained in the compartments within the connector assembly and should be readily movable for replacement without unsoldering or severing any connections. The purpose of the present invention is to provide such a connector assembly.

SUMMARY OF THE INVENTION

According to the principal aspect of the present invention, there is provided an electrical connector assembly for interconnecting an electrical circuit element having a plurality of conductive pads on one surface thereof with a mounting member, such as a printed circuit board, having conductive strips thereon. The connector assembly comprises an insulative housing having a plurality of compartments therein each containing a contact formed of a spring metal strip. Preferably the contacts are S-shaped. The upper portion of each contact extends above an upwardly facing surface which supports the circuit element so as to contact the conductive pad on the lower surface thereof. The lower portion of each contact extends downwardly through an aperture in the bottom of the housing for engagement with a conductive strip on the printed circuit board. Preferably the free end of the upper portion of each contact extends into a recess formed at one side of each compartment to retain the contact in the compartment. The contacts may be easily removed from the housing without unsoldering or severing any connections, and without removing the housing from the printed circuit board. A plurality of such contacts may be mounted simultaneously into the compartments in the housing of the connector assembly, thus minimizing assembly time. Other aspects and advantages of the invention will become more apparent from the following description taken in connection with the accompanying drawings.

DESCRIPTION OF THE PREFERRED EMBODIMENT

Figures 1, 2, 3, 7:
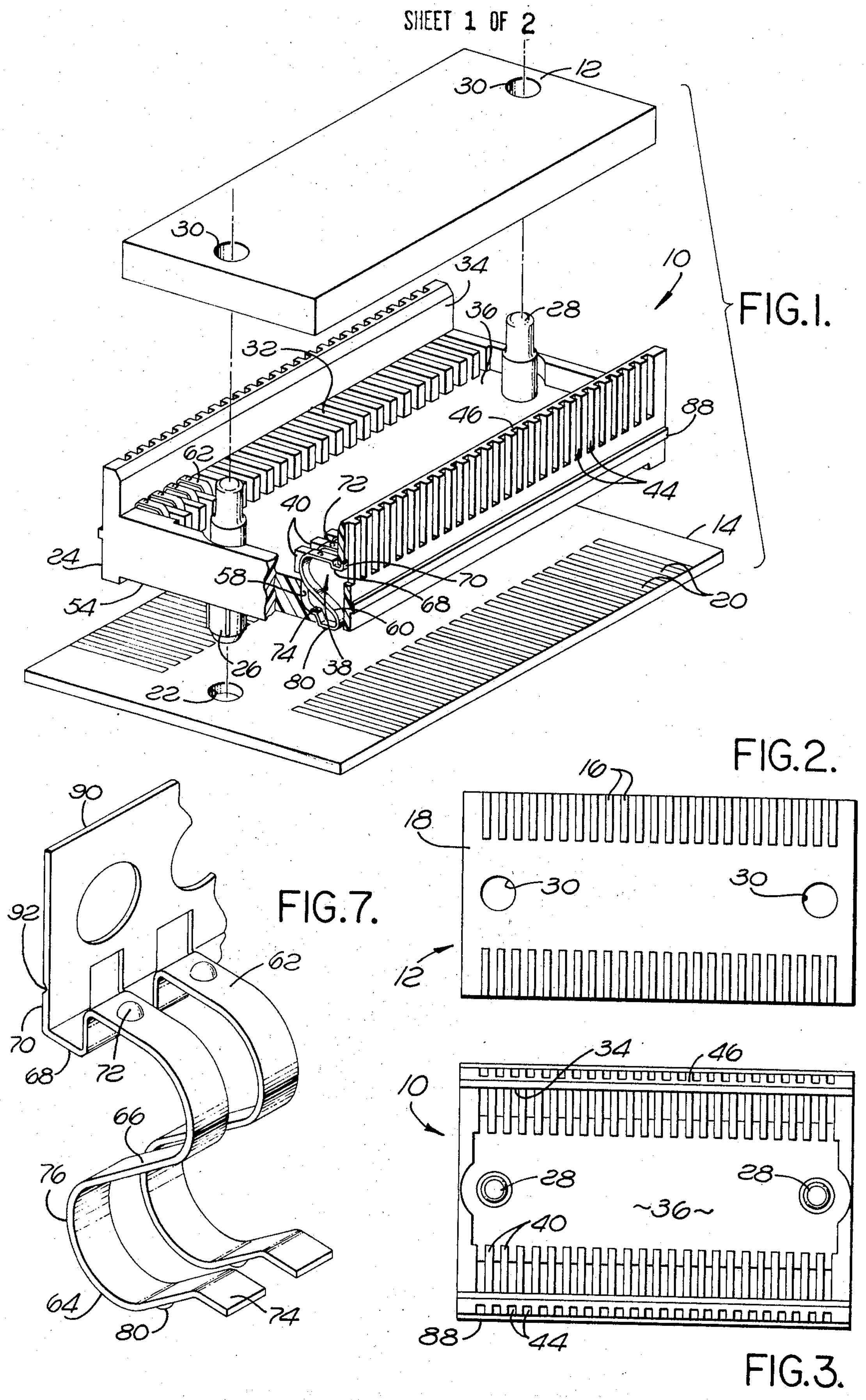
FIG. 1 is a perspective view illustrating an electrical circuit element positioned to be mounted on an electrical connector assembly constructed in accordance with the present invention, with a portion broken away to show a contact therein, such assembly being positioned over a printed circuit board.
FIG. 2 is a bottom view of the electrical circuit element illustrated in FIG. 1.
FIG. 3 is a top plan view of the electrical connector assembly of the invention.
FIG. 7 is a perspective view of a plurality of contacts joined by a common carrier strip.

Referring now to FIG. 1 in detail, there is shown the electrical connector assembly or socket of the present invention, generally designated 10, which may be used to interconnect an electrical circuit element 12 to a mounting member 14. The electrical circuit element, which is a leadless integrated circuit, has a plurality of conductive pads 16 formed on its lower surface 18. While the element 12 has been described as being an integrated circuit, it may be any other electrical circuit component which has conductive pads on one surface.

The mounting member 14 is a printed circuit board having conductive strips or traces 20 thereon. The spacing of the conductive strips 20 on the board is identical to the spacing of the conductive pads 16 on the circuit element 12.

Holes 22 are provided in the printed circuit board adjacent to the opposite ends thereof. Only one of such holes is seen in FIG. 1. The connector or socket assembly 10 comprises a housing or shell 24, generally rectangular in configuration and preferably formed as an integral plastic molding. The housing is provided with downwardly extending hubs 26 aligned with the holes 22 in the board 14. such hubs are somewhat larger than the holes to establish an interference fit that releasably retains the housing on the board. Other fastening means may be used, if desired. The housing is also formed with a pair of upstanding guide posts 28 which extend into holes 30 in the circuit element 12 when the latter is mounted on the connector assembly 10.

The housing 24 includes an upwardly facing surface 32 which supports the circuit element 12. A pair of parallel upright walls 34 extend along the elongated sides of the housing 24. The walls are spaced apart a distance slightly greater than the width of the circuit element 12. A rectangular recess 36 is formed on the intermediate portion of the housing 24 and opens up the surface 32 thereof. The guide posts 28 extend upwardly from the bottom of the recess 36. If desired, a heat sink, not shown, may be positioned in the recess 36.

Figures 4, 5:
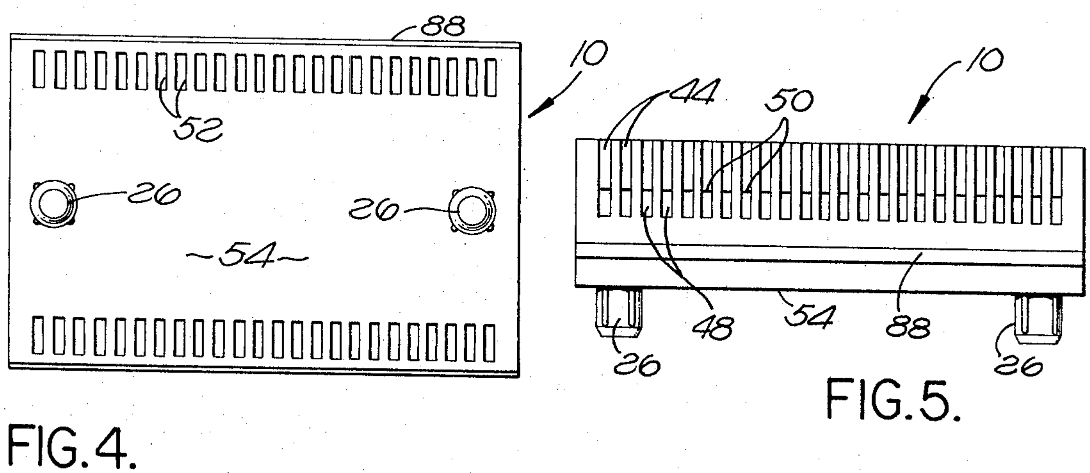
FIG. 4 is a bottom view of the electrical connector assembly.
FIG. 5 is a side elevational view of the electrical connector assembly.
Figure 6:
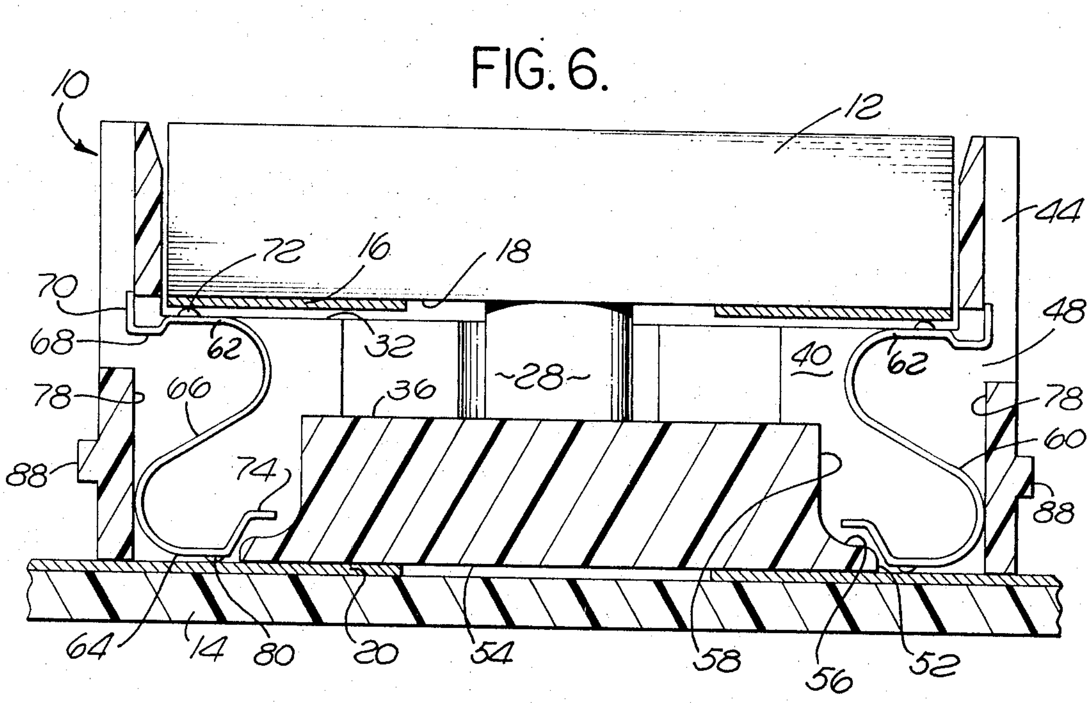
FIG. 6 is an enlarged, partial transverse sectional view showing the connector assembly of the invention interconnecting the electrical circuit element with the printed circuit board.
Figure 8:
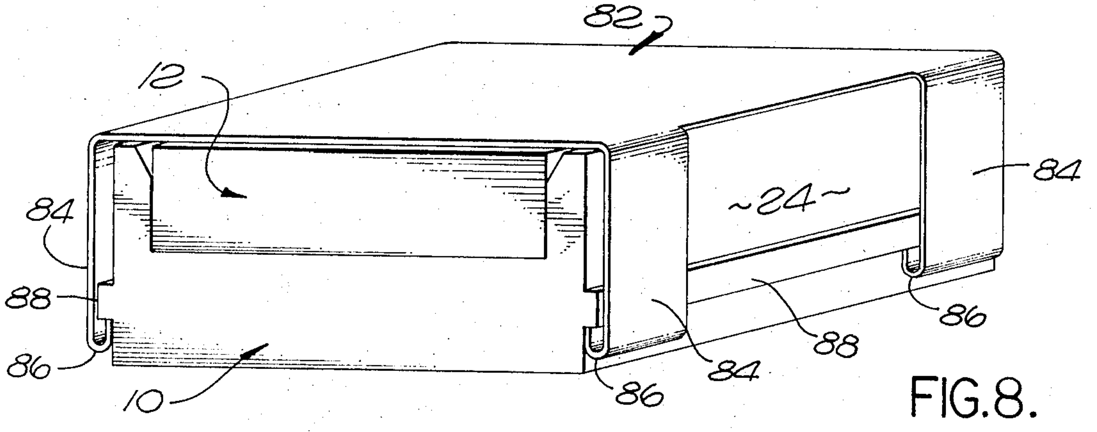
FIG. 8 is a perspective view of the electrical connector assembly of the invention with a cover thereon for retaining the electrical circuit element on the assembly.

A plurality of contact compartments 38 are provided along the sides of the housing 24. The spacing of these compartments is identical to the spacing between the conductive pads 16 on the circuit element 12 and conductive strips 20 on the printed circuit board. The compartments are separated by upright partitions 40 which extend upwardly from the bottom of the recess 36. The upper edges of the partitions define the supporting surface 32. The upper portions of the walls 34 extend upwardly beyond the upper edges of the partitions. Vertical slots 44 are formed in the outer surface of the walls 34 adjacent to their upper edges 46. These slots are aligned with the compartments 38. As best seen in FIG. 5, windows 48 extend laterally through the walls from the compartments 38 to the slots 44. Preferably the tops 50 of the windows are coplanar with the upper edges of the partitions 40.

A plurality of vertical apertures 52 are formed in the bottom of the housing 24 and extend from the contact compartments 38 to the lower surface 54 of the housing. An upwardly facing shoulder 56 is provided in each compartment 38 adjacent to the inner side 58 of the compartment. Generally S-shaped electrical contact elements, generally designated 60, are positioned in the compartments 38. The contacts are made of spring metal strips formed into the desired configuration. Each contact includes an upper portion 62, a lower portion 64 and an intermediate portion 66 which joins the upper and lower portions. The free end 68 of the upper portion 62 of each contact has a generally U-shaped configuration, terminating in an upwardly extending tip 70. The upper edge of the tip extends above the upper portion 62 of the contact. A protuberance 72 is provided on the upper surface of the upper portion 62 of the contact. The free end 74 of the lower portion 64 of each contact extends upwardly and outwardly.

As seen in FIG. 1, before the connector assembly 10 is mounted on a printed circuit board 14, and before the circuit element 12 is mounted on the connector assembly, the lower portion 64 of each contact extends below the lower surface 54 of the connector assembly. The free end 74 of the lower portion of each contact engages the upwardly facing shoulder 56 in the compartment 38. The U-shaped free end 68 of the upper portion of each contact engages the top 50 of the window 48 and the tip 70 extends upwardly in the slot 44 in the wall 34. The upper portion 62 of the contact also extends above the upwardly facing surface 32 of the housing. The length of the vertical tip portion 70 of each contact is greater than the distance between the upper portion 62 of the contact and the surface 32 so that when the upper portion is depressed below such surface by the circuit element 12, the tip of the contact will remain in the slot 44. Each contact includes a curved transitional section adjacent to the lower portion 64 thereof. This curved section engages the outer side 78 of the compartment 38. The lower portion 64 of the contact is also formed with a protuberance 80 on its lower surface.

When the connector assembly 10 is mounted on the printed circuit board 14 by press-fitting the hubs 26 to the openings 22, the protuberances 80 on the lower portions 64 of the contacts will engage the conductive strips 20 on the board. When the lower portions of the contacts deflect upwardly upon mounting the connector assembly on the printed circuit board, such portions will travel in an arc which imparts a wiping action between the protuberances 80 and the conductive strips 20. The same wiping action occurs when the circuit element 20 is mated with the connector assembly 10, causing the upper portions 62 of the contacts to travel in an arc while being deflected downwardly. The protuberances 62 and 80 on the contacts provide a high unit force between the contacts and the conductive pads 16 and conductive strips 20, respectively. The S-shaped spring configuration of the contacts provides the shortest electrical path between the circuit element and conductive strips on the printed circuit board.

The circuit element 12 is releasably retained on the upwardly facing surface 32 of the connector assembly 10 by means of a cover, generally designated 82. The cover is a metal stamping formed with two downwardly extending legs 84 along each side. The legs are bent inwardly and upwardly at their lower ends to from hooks 86. The hooks engage under elongated projections 88 formed along the sides of the housing 24. As will be appreciated, the cover 82 will snap onto the housing 24 when the cover is pressed downwardly over the housing. The cover may be removed by inserting a suitable tool, not shown, between the hooks 86 and the housing wall to force the hooks out from below the projections 88, other types of covers could be used, if desired.

Preferably, the contacts 60 are made from a single long thin sheet of metal joined by a common carrier strip 90. The contacts are initially stamped from a flat sheet and thereafter are formed into the desired configuration as seen in FIG. 7 while the individual contacts are still joined together by the carrier strip. The contacts are slightly beveled to a reduced section 92 where the contacts are connected to the carrier strip 90 which allows the strip to be broken away from the contacts after the latter are inserted into the compartments 38 in the housing 24.

To mount the contacts in the compartments 38, one row of the contacts joined by the carrier strip 90 are positioned over a row of compartments at a slight angle. The contacts are partially inserted into the compartments with the carrier strip sliding along the inside of the wall 34 of the housing. Once the contacts are almost fully seated in the compartments, the carrier strip is broken off. Then a suitable tool, not shown, is brought into engagement with the upper portions 62 of the contacts and moved vertically downwardly until the tips 70 of the contacts pass below the tops of the windows 48 and then spring upwardly into the slots 44 in the outside of the wall 34. The tips 70 and the free ends 74 of the contacts serve to retain the contacts in the compartments 38.

It will be appreciated that by the present invention the contacts 60 may be easily and rapidly mounted in the housing 24, and will engage the conductive strips on the circuit element 12 and printed circuit board 14 without the requirement of soldering or other connecting techniques. Thus, assembly time is minimized. Further, the connector assembly 10 may be easily mounted on the printed circuit board due to the frictional engagement of the hubs with the holes 22 in the board. In order to remove the contacts from the housing 24 for replacement or servicing, it is only necessary to utilize a tool, not shown, in the form of a comb having spaced teeth. The teeth are inserted downwardly into the slots 44 to remove the tips 70 from behind the walls 34, thus permitting the contacts to be drawn upwardly from the compartments 38. Also, it will be appreciated that the contacts are simple in configuration and may be manufactured with a minimum of expense.

What is claimed is:

1. An electrical connector assembly for interconnecting an electrical circuit element having a plurality of conductive pads on one surface thereof with a mounting member having conductive strips thereon, comprising:

an insulative housing member having means defining an upwardly facing planar surface adapted to support said circuit element and a lower surface adapted to overlie said mounting member;

a plurality of compartments formed in said housing member, said compartments opening upwardly at said planar surface;

vertical apertures in said housing member extending downwardly from said compartments to said lower surface; and a contact positioned in each of said compartments, said contact being formed of a spring metal strip, said contact means defining an upper portion extending above said planar surface, said means having a generally convex configuration for making wiping engagement with one of said conductive pads, a lower portion extending across and downwardly through said aperture below said lower surface, said lower portion having a generally convex configuration for making wiping engagement with one of said conductive strips, and an intermediate portion joining said upper and lower portions.

2. An assembly as set forth in claim 1 wherein an upwardly facing shoulder is provided on one side of each said compartment adjacent the lower portion thereof, and said lower portion of said contact has a free end which extends over said shoulder.

3. An assembly as set forth in claim 1 wherein a recess is provided on one side of said compartment adjacent to said planar surface; and said upper portion of said contact has a free end which extends into said recess to retain said contact in said compartment.

4. An assembly as set forth in claim 1 wherein said contact has a generally S-shaped configuration.

5. An assembly as set forth in claim 4 wherein an upwardly facing shoulder is provided on one side of each said compartment adjacent the lower portion thereof, and said lower portion of said contact has a free end which extends over said shoulder.

6. An assembly as set forth in claim 5 wherein a recess is provided on the side of said compartment opposite to said one side and adjacent to said planar surface; and said upper portion of said contact has a free end which extends into said recess to retain said contact in said compartment.

7. An assembly as set forth in claim 6 wherein said contact embodies a curved transitional section adjacent to said lower portion thereof; and said curved transitional section engages said opposite side of said compartment.

8. An assembly as set forth in claim 1 wherein said housing member embodies a pair of parallel upright walls along the sides thereof, said walls extending above said planar surface.

9. An assembly as set forth in claim 8 wherein windows extend through said walls opening into said compartments; and said upper portions of said contacts have free ends which extend into said windows.

10. An assembly as set forth in claim 9 wherein said free ends extend through said windows; and said free ends of said contact upper portions have tips which extend upwardly a distance greater than the distance said upper portions extend above said upwardly facing surface.

11. An assembly as set forth in claim 1 including cover means for releasably retaining an electrical circuit element on said housing member in engagement with said upwardly facing surface.

12. An electrical connector assembly for receiving an electrical circuit element having a plurality of conductive pads on one surface thereof comprising:

a mounting member having conductive strips thereon;

an insulative housing member having means defining an upwardly facing planar surface adapted to support said circuit element and a lower surface, means releasably mounting said housing member on said mounting member;

a plurality of compartments formed in said housing member, said compartments opening upwardly at said palanr surface;

vertical apertures in said housing member extending downwardly from said compartments to said lower surface; and a contact positioned in each of said compartments, said contact being formed of a spring metal strip, said contact having means defining an upper portion extending above said planar surface, said means having a generally convex configuration for making wiping engagement with one of said conductive pads, a lower portion extending across and into said aperture to said lower surface, said lower portion having a generally convex configuration and making wiping engagement with one of said conductive strips, and an intermediate portion joining said upper and lower portions, said lower portion extending below said lower surface of said housing member when said housing member is detached from said mounting member.

13. An assembly as set forth in claim 12 wherein said contact has a generally S-shaped configuration.

14. An assembly as set forth in claim 12 wherein an upwardly facing shoulder is provided on one side of each said compartment adjacent the lower portion thereof, and said lower portion of said contact has a free end which extends over said shoulder.

15. An assembly as set forth in claim 12 wherein a recess is provided on one side of said compartment adjacent to said planar surface; and said upper portion of said contact has a free end which extends into said recess to retain said contact in said compartment.

16. An assembly as set forth in claim 12 wherein said contact has a generally S-shaped configuration; and upwardly facing shoulder is provided on one side of each said compartment adjacent the lower portion thereof, and said lower portion of said contact has a free end which extends over said shoulder; a recess is provided on the other side of said compartment adjacent to said planar surface; and said upper portion of said contact has a free end which extends into said recess to retain said contact in said compartment.

* * * * *